United States Patent [19]
Tamura et al.

[11] 4,405,887
[45] Sep. 20, 1983

[54] DRIVE CIRCUIT FOR A WIPER DEVICE

[75] Inventors: Takeo Tamura, Yokohama; Hiroshi Hara, Funabashi; Takayoshi Kido, Yokohama, all of Japan

[73] Assignee: Nissan Motor Company, Limited, Tokyo, Japan

[21] Appl. No.: 310,362

[22] Filed: Oct. 9, 1981

[30] Foreign Application Priority Data

Oct. 13, 1980 [JP] Japan .................. 55-141968

[51] Int. Cl.³ .................................. H02P 1/04
[52] U.S. Cl. ..................................... 318/443; 318/54; 318/65; 318/467
[58] Field of Search ............ 318/49, 50, 54, 65, 318/282, 443, 467, DIG. 2, 444, 468; 15/250.12, 250.13, 250.17

[56] References Cited
U.S. PATENT DOCUMENTS 3,721,878 3/1973 Gumbert .................. 318/DIG. 2 X

FOREIGN PATENT DOCUMENTS 713388 11/1941 Fed. Rep. of Germany .
2549642 5/1976 Fed. Rep. of Germany .
1561394 2/1980 United Kingdom ................ 318/443
2039084 7/1980 United Kingdom .
1573900 8/1980 United Kingdom ................ 318/443
1574650 9/1980 United Kingdom .

Primary Examiner—Ulysses Weldon
Attorney, Agent, or Firm—Lowe, King, Price & Becker

[57] ABSTRACT

A drive circuit for a wiper device includes reversible driving motors for alternately driving a pair of wiper assemblies in first and second directions. Each driving circuit includes a switching means and a means for detecting both ends of the wiper blade motions in the first and second directions. The switching means is operative to switch the direction of electric current supplied to an electric motor when the detecting means detects the end of wiper blade motion. Each driving circuit is connected to both of switching means so that it can reverse the current supplied to the driving motor when both of switching means detect the ends of the wiper assembly motion.

33 Claims, 2 Drawing Figures

DRIVE CIRCUIT FOR A WIPER DEVICE

BACKGROUND OF THE INVENTION

The present invention relates generally to a drive circuit for a wiper device for cleaning a vehicle windshield, wing mirrors of an automotive vehicle and so on. More specifically, the present invention relates to a wiper device drive circuit which is adapted to drive a pair of wiper assemblies in synchronism with each other.

Conventionally, automotive vehicle wiper devices include a crank mechanism and linkage for connecting the crank mechanism to a driving motor. The crank mechanism is adapted to transmit the driving power of the motor to the wiper assembly to reversibly drive the same. A pair of wiper assemblies are provided for cleaning or wiping the automotive windshield. The crank mechanism is connected to the wiper assemblies to drive the latter in synchronism with each other.

Recently, developed wiper assemblies are directly connected to reversible drive motors for reducing the size thereof. In such wiper system, the drive motors are controlled electrically to reverse the driving direction by respective control circuits. The wiper systems of this type are applicable to the front windshield wiper as well as to head lamp and the wing mirror wipers. Since the head lamp or the wing mirror wipers must be compact enough to be located in relatively small spaces, the electrically controlled wiper system is useful. On the other hand, each pair of windshield or wing mirror wipers must be synchronously driven. However, there is a tendency for the motion of each wiper in an assembly of a pair of wipers to differ due to differences of electric response characteristics of the driving circuits.

This necessarily degrades driving comfort and sometimes requires the driver to manually adjust the wiper motion during driving.

An object of the present invention is to provide a wiper drive circuit which can eliminate the drawback in the prior art.

It is another object of the present invention to provide a wiper device drive circuit, which is capable of driving a pair of wiper blades in synchronism with one another and has simple and low cost circuit construction.

SUMMARY OF THE INVENTION

To accomplish the above-mentioned and other objects, a drive circuit for a wiper device according to the present invention includes reversible driving motors for alternately driving a pair of wiper assemblies in first and second directions. Each driving circuit includes a switching means and a means for detecting the end of the wiper blade motion in the first and second directions. The switching means is operative to switch the direction of an electric power supply to an electric motor when the detecting means detects the end of wiper blade motion. Each driving circuit is connected to both of the switching means to reverse the power supply to the driving motor when both of switching means detect the ends of the wiper assembly motion.

The other objects and advantages sought in the invention will be made clear from hereinafter given detailed description of the invention in term of the preferred embodiment.

BRIEF DESCRIPTION OF THE DRAWINGS

The present invention will become more fully understood from the detailed description given below, and from accompanying drawings of the preferred embodiments of the present invention, which, however, are not to be taken as limiting the present invention in any way, but are for the purpose of elucidation and explanation only.

In the drawings.

DESCRIPTION OF THE PREFERRED EMBODIMENT

Figure 1:
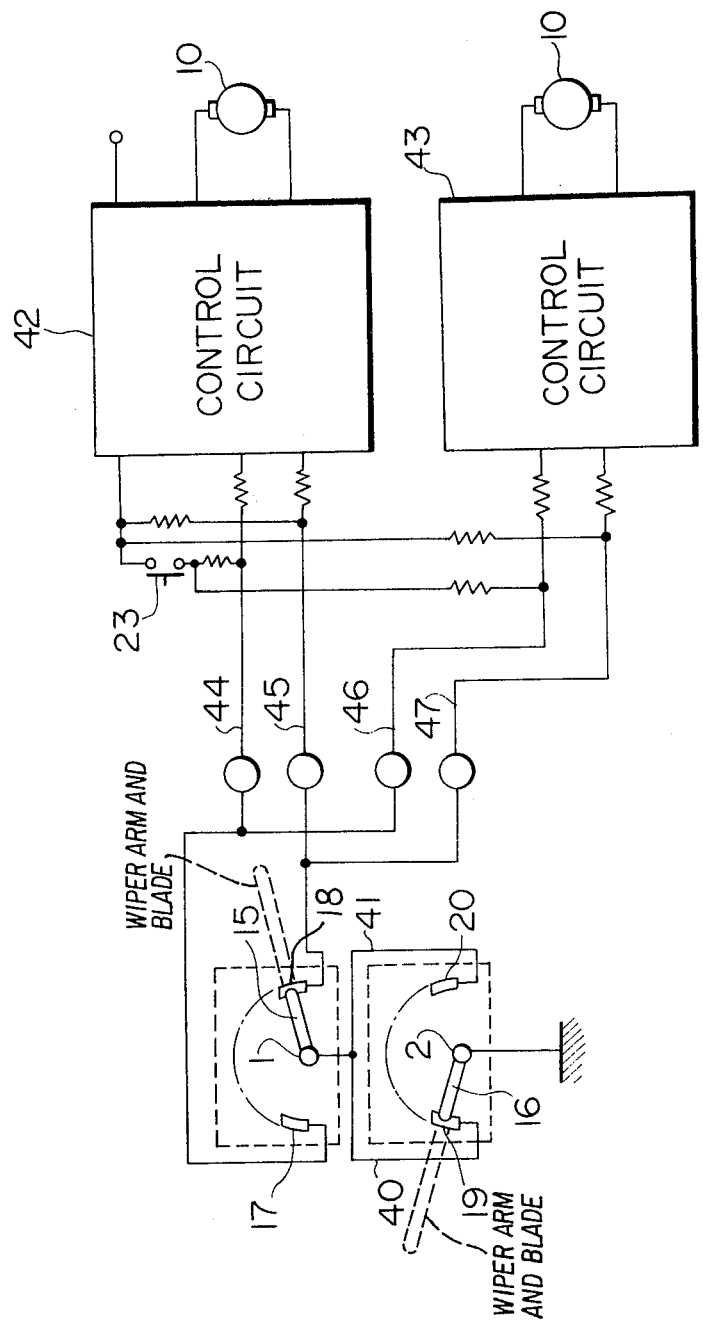
FIG. 1 is a schematic block diagram of a preferred embodiment of a drive circuit for the wiper device according to the present invention.

Referring now to FIG. 1, there is illustrated, in block diagram form, a preferred embodiment of a driving circuit for a pair of wiper assemblies according to the present invention. Generally, each of the wiper assemblies comprises a wiper arm and a wiper blade, mounted at the free end of the wiper arm. The wiper arms are secured to a drive shafts 1 and 2 of reversible motors 10 respectively. A differential gear assembly (not shown) may be connected between the motor shaft and the wiper arm for adjusting the speed of the wiper assembly.

Movable switch members 15 and 16 are respectively secured to the drive shaft 1 and 2 of the reversible motor 10 for motion with the wiper assembly. On the orbits of respective end portions of the movable switch members 15 and 16 remote from the drive shafts, there are provided pairs of stationary switch members 17 to 20, arranged so switch 15 engages members 17 and 18, while switch 16 engages members 19 and 20. Each of stationary switch members 17 to 20 is arranged so that it defines one end of the wiper assembly motion.

The movable switch member 15 is connected to stationary switch members 19 and 20 via leads 40 and 41. The movable switch member 16 is grounded. In turn, the stationary switch members 17 and 18 are connected to drive control circuits 42 and 43 via leads 44 to 47, whereby leads 44 and 46 are connected to member 17 and leads 45 and 47 are connected to member 18. Therefore, if either one of the movable switch member 15 or 16 contacts one of the stationary contacts 17 to 20, the driving direction of the reversible motor 10 is still maintained and can not be altered. When both movable switch members 15 and 16 respectively contact corresponding stationary members 17 or 18 and 19 or 20, the drive control circuits 42 and 43 become operative to reverse the driving direction.

Figure 2:
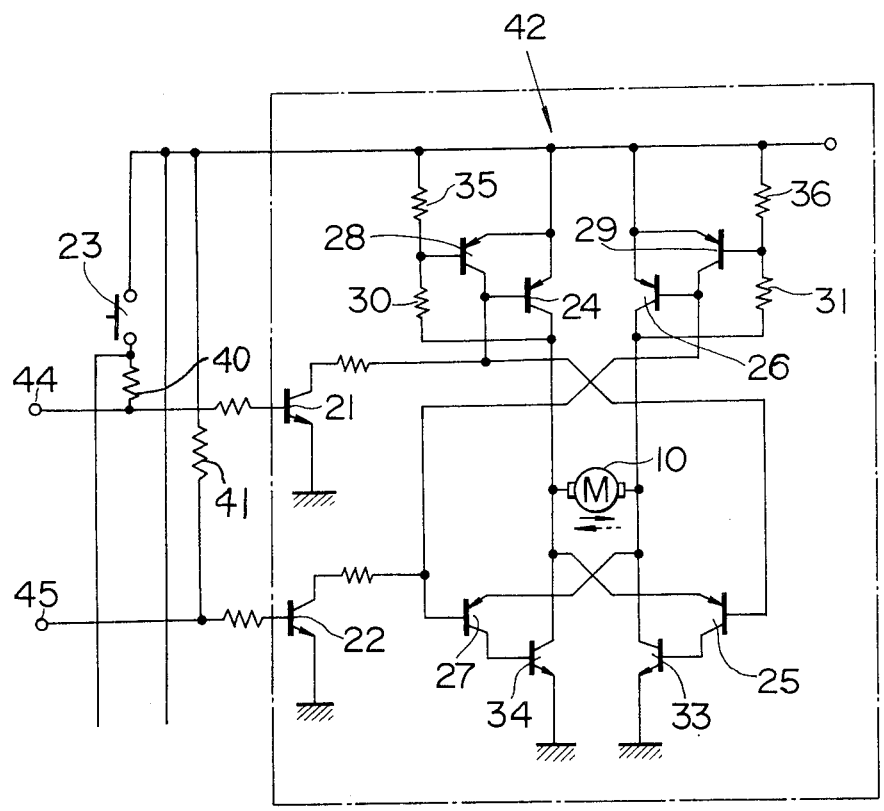
FIG. 2 is a circuit diagram of a driving circuit of FIG. 1.

Drive control circuit 42 is illustrated in greater detail in FIG. 2 wherein leads 44 and 45 are illustrated as connected to base electrodes of switching transistors 21 and 22. The base electrodes of the switching transistors 21 and 22 are respectively connected to a power supply terminal $V_{cc}$ via driving switch 23 and bias resistor 41. The collector electrodes of the transistors 21 and 22 are connected to base electrodes of transistors 24 and 25 and base electrodes of transistors 26 and 27, respectively. The transistors 24 to 27 are of P-N-P type transistors. The emitter electrodes of the transistors 24 and 26 are connected to power supply terminal $V_{cc}$ for the drive control circuits 42 and 43. Since the drive control circuits 42 and 43 have substantially the same construction, drive circuit 43 is considered identical to that described in connection with circuit 42, illustrated in FIG. 2.

As set forth, the stationary contacts 17 and 18 are connected to the drive control circuit 42 via the lines 44 and 45. The signals on lines 44 and 45 are respectively coupled to the base electrodes of the transistors 28 and 29 through transistors 21 and 22, as well as bias resistors 30 and 31. The emitter electrodes of the transistors 24, 26, 28 and 29 are connected with a power supply terminal $V_{cc}$.

On the other hand, the collector electrodes of the transistors 25 and 27 are respectively connected with base electrodes of transistors 33 and 34. Also, the collector electrodes of the transistors 24 and 26 are respectively connected with the collector electrodes of the transistors 33 and 34.

In FIG. 2, bias resistors 35 and 36 are respectively associated with the bias resistors 30 and 31 so that one of coupled bias resistors 30 and 35 or 31 and 36 bias the corresponding transistor 28 and 29.

When drive switch 23 is closed, voltage from terminal $V_{cc}$ is applied to terminals 44 and 46. In the initial position of the wiper assembly, the movable switch member 15 contacts the stationary switch member 18 and the movable switch member 16 contacts the stationary switch member 19. Therefore, current from the voltage source $V_{cc}$ is coupled from terminal 45 to ground through the stationary switch member 18, the movable switch member 15, the stationary switch member 19 and the movable switch member 16. Therefore, the potential on the base electrode of the transistor 22 goes low to turn off the same. On the other hand, the $V_{cc}$ potential supplied to terminal 44 is applied to the base electrode of the transistor 21 to turn on the same. In response to turn on of the transistor 21, potential on the base electrodes of the transistors 24 and 25 drops to turn on both of transistors 24 and 25. In response to turn on of transistors 24 and 25 the transistors 28 and 33 turn on. As a result, current from source $V_{cc}$ flows through the transistor 24, the motor 10 and transistor 33 to drive the motor in a first direction so moveable switch member 15, together with the wiper assembly associated therewith, rotates about its pivot toward the stationary switch member 17.

The same electric function takes place in the drive control circuit 43 for the motor of the other wiper assembly associated with switch member 16. As the motor associated with switch member 15 drives motor 15 from contact 18 toward contact 17, the motor associated with member 16 drives member 16 from contact 19 toward contact 20.

The rotations of the motors 10 are transmitted to the drive shafts 1 and 2 through the differential gears to drive the drive shafts 1 and 2 in the clockwise direction. The wiper arms are thereby clockwise driven by the drive shafts 1 and 2. At the same time, the movable switch members 15 and 16 are rotated away from the stationary switch members 18 and 19, so terminals 44 and 45 are both decoupled from ground via switch members 15 and 16. As a result, current from source $V_{cc}$ is applied to both of transistors 21 and 22 whereby the transistor 22 is turned on. At this time, since the voltage of the base electrodes of the transistors 26 and 27 is approximately zero, the transistors 26 and 27 are maintained at cut-off in spite of turn on of the transistor 22. Thus, current from source $V_{cc}$ continues flowing through the transistor 24, the motor 10 and the transistor 33 until the wiper blade and arm 15, ganged with it, reach the end of the motion thereof, at which time rotatable element 15 engages the contact 46.

At the end of the motion of the wiper assemblies in the first direction, the movable switch members 15 and 16 engage the stationary switch members 17 and 20 respectively. Thus, the potential of the terminal 44 is grounded through the stationary switch member 17, the movable switch member 15, the stationary switch member 20 and the movable switch member 16. Therefore, the potential on the base electrode of the transistor 21 goes low to turn off the transistor.

In response to turning off of the transistor 21, the transistors 24 and 25 turn off. Therefore, the transistors 26, 27, 29 and 34 turn on. As a result, current from source $V_{cc}$ flows through the transistor 26, the motor 10 and the transistor 34 to drive the motor in the second direction opposite to the first direction. In response to changing the drive direction of the motor 10, the wiper assemblies and the movable switch members 15 and 16 rotate in the second direction, i.e. counterclockwise. The motor 10 continues to turn in the second direction until the movable switch members 15 and 16 respectively engage the stationary switch contacts 18 and 19. By repeating the above-mentioned switching operation, the wiper assemblies are alternately in first and second directions.

As apparent from the foregoing, if either one of the movable switch members 15 and 16 engages the stationary switch contacts 17 and 20 before the other movable switch member reaches the stationary switch contact associated with it the potential on the base electrodes of the transistors 21 and 22 remains high. Therefore, changing the drive directions of the driving motors 10 always occurs only when both of the movable switch members 15 and 16 engage the stationary contacts.

If the driving switch 23 is turned off, i.e., opened, while the wiper assemblies and the movable switch members 15 and 16 rotate in the first direction, the transistor 21 is cut off to turn off the transistors 24, 25 and 33.

At this time, the transistor 22 stays on in response to the forward base applied thereto by $V_{cc}$, whereby transistors 26, 27 and 34 stay cut-off because the base bias thereof is approximately zero. In response to turn off of the transistors 24 and 25, the transistors 26, 27 and 34 turn on to permit current from terminal $V_{cc}$ to flow through the transistor 26, the motor 10 and the transistor 34, to drive the motor in the second direction. Thus, the wiper assemblies and the movable switch members 15 and 16 rotate counterclockwise until the movable switch members engage stationary contacts 18 and 19. When the movable switch members 15 and 16 engage contacts 18 and 19, the base of transistor 22 is grounded through the moveable switch members 15 and 16 and the stationary switch members 18 and 19 to stop the wiper motion.

Thus, the present invention can fulfill all of the objects and advantages sought thereto.

While the present invention has been shown and described in detail with respect to the preferred embodiments, it should not, however, be considered as limited to that embodiments or any other embodiments. Further, variations could be made to the form and the details of any parts of elements, without departing from the principle of the invention.

What is claimed is:

1. A wiper device for an automotive vehicle comprising:
   first and second wiper assemblies having wiper blades and wiper arms respectively;
   first and second reversible driving motors connected with said first and second wiper assemblies for driving said first and second wiper assemblies in first and second directions alternately, said first and second driving motors being adapted to be simultaneously driven in the same directions with respect to each other;
   a first drive control circuit associated with said first driving motor for controlling the driving direction of said first driving motor;
   a second drive control circuit associated with said second driving motor for controlling the driving direction of said second driving motor;
   first and second switch means, incorporated in said first and second drive control circuits for switching direction of current supplied to each of said first and second driving motor for reversing the driving directions of said driving motor; and
   first and second end detectors for detecting given motion ends of said first and second wiper assemblies in said first and second directions, said first and second end detectors being coupled with each other so that there is derived a switching signal for switching said first and second switch means of said first and second drive control circuits between a first position for driving said first and second driving motors in said first direction and a second position for driving said first and second driving motors in said second direction, said switching signal being derived when both of said first and second detectors detect the motion ends of said first and second wiper assemblies.

2. A wiper device for an automotive vehicle comprising:
   first and second wiper assemblies having wiper blades and wiper arms respectively;
   first and second reversible motors respectively connected to said wiper arms of the first and second wiper assemblies for alternately driving the first and second wiper assemblies in first and second directions;
   first and second drive control circuits respectively associated with said first and second reversible motors for controlling the driving directions of said reversible motors, which first and second drive control circuits are adapted to drive said first and second reversible motors simultaneously in the same direction with respect to each other;
   first and second switch means incorporated in each of said drive control circuits, said first and second switch means being selectively turned on, said first switch means, when turned on, being adapted to switch the driving direction of said first and second reversible motors from a first direction to a second direction and said second switch means, when turned on, being adapted to switch the driving direction of said reversible motor from said second direction to said first direction;
   a holding means for holding said first and second drive control circuits after one of said first and second switch means has been turned on and until the other of first and second switch means has been turned on so that the driving directions of the first and second reversible motors are maintained until the wiper assemblies come to the end travel positions thereof; and
   first and second end detectors for detecting end travel positions of said first and second wiper assemblies in said first and second directions, said first and second end detectors being coupled with each other so that there is derived a switching signal for switching said first and second switch means of said first and second drive control circuits between a first position for driving said first and second driving motors in said first direction and a second position for driving said first and second driving motors in said second direction, said first and second signals being derived when both of said first and second detectors detect the motion ends of said first and second wiper assemblies.

3. The wiper device as set forth in claim 1 or 2, wherein each of said first and second end detectors comprises a movable switch member and a pair of first and second stationary switch members respectively located at positions corresponding to respective motion ends of said first and second wiper assemblies, said first and second stationary switch members of said first end detector being connected with said first and second switch means of said first and second drive control circuits, said first and second stationary switch members of said second end detector being connected to said movable switch member of said first end detector, and said movable switch member of said second end detector being grounded.

4. The wiper device as set forth in claim 3, wherein said first and second switch means respectively comprise first and second transistors, each of said transistors having electrodes connected with said first and second stationary switch members of said first end detector and with a power source.

5. A drive circuit for an automotive wiper device having a pair of wiper assemblies, each including a wiper blade and a wiper arm comprising:
   first and second drive control circuits for the wiper assemblies, each including: a reversible motor for driving the wiper assembly simultaneously in the same directions with respect to each other, a first circuit connecting said reversible motor to a power source so that said reversible motor is driven in a first direction and a second circuit connecting said reversible motor to said power source so that said reversible motor is driven in a second direction opposite to said first direction;
   first and second switch means respectively connected to said first and second circuits in said first and second drive control circuits so that each of the switch means connects and disconnects the reversible motor to said power source, said first and second switch means operating alternately with respect to each other so that one of the switch means disconnects the motor from said power source when the other switch means connects the motor to said power source; and
   end detectors for detecting motion ends of respective wiper assemblies, said end detectors switching said first and second switch means between a first position for connecting said motor to said power source and a second position for disconnecting said motor from said power source, said end detectors being connected to each other and cooperating with each other to switch said first and second switch means between said first position and said second position.

6. The circuit as set forth in claim 5, wherein said end detectors are connected in series for switching the condition of said first and second switch means between said first and second conditions when both of the end detectors detect the motion ends of the wiper assemblies.

7. The circuit as set forth in claim 5 or 6, wherein each of said first and second switch means includes transistors connected to the power source to alternately supply current in opposite directions to the motor while the wiper assemblies are between the motion ends, said transistors being respectively connected to said end detectors so that one of said transistors is turned off when both of said end detectors detect a motion end of the wiper assemblies to reverse the direction of current flowing through the motor.

8. The circuit as set forth in claim 7, wherein each of said end detectors comprises a first detector and a second detector, each of said first and second detectors detecting opposite motion ends of one of said wiper assemblies and having a movable switch member rotatable with said wiper arm and a pair of first and second stationary switch members, said first and second stationary members of said first detector being respectively connected to said first and second switch means, said movable switch member being adapted to contact one of said first and second stationary switch members of said first detector, said movable switch member being connected with a pair of said first and second stationary switch members of said second detector, and said movable switch member being movable in synchronism with the motion of the associated wiper assembly and adapted to contact one of said stationary switch members when the wiper assembly reaches the end of the motion, said movable switch member of said second detector being grounded to connect one of said first and second switch means to turn the same off.

9. An automotive wiper drive circuit for reversibly driving a pair of wiper assemblies, comprising:
first and second reversible motors for respectively driving said wiper assemblies in first and second directions;
first and second drive control circuits respectively associated with said first and second reversible motors for reversing the directions of current supplied in first and second directions for reversibly driving said respective first and second reversible motors, said first and second drive control circuits being associated with each other for driving said first and second reversible motors in synchronism with each other;
a first end detector for detecting motion ends of wiper assemblies in said first direction for deriving a first detected signal when the motion ends of both of said wiper assemblies are detected;
second end detector adapted to detect the motion ends of said wiper assemblies in said second direction and producing a second detector signal when the motion ends of both of said wiper assemblies are detected;
a first switch connected between said first and second end detectors and said first drive control circuit and responsive to said first and second detector signals for reversing the direction of current supplied to the motor; and a second switch connected between said first and second detectors and said second drive control circuit and responsive to said first and second detector signals for reversing the direction of current supplied to the motor.

10. The drive circuit as set forth in claim 9, wherein said first detector includes a first member for detecting a first motion end of one of said wiper assemblies, a second member adapted to detect a first motion end of the other wiper assembly, and said second end detector including a first member adapted to detect a second motion end of said one of wiper assemblies and a second member adapted to detect a second motion end of said other wiper assembly, said first and second members of said first and second end detectors being respectively connected in series with each other and a power source terminal.

11. The drive circuit as set forth in claim 10, wherein said first and second drive control circuits are connected to said first and second end detectors in parallel relationship with respect to each other.

12. The drive circuit as set forth in claim 9, 10 or 11, further comprising means for holding said first and second drive control circuit in a condition to supply the current in one of said first and second directions until one of said first and second detector signals is derived.

13. Apparatus for controlling the drive of plural wiper blade assemblies comprising plural reversible motors, one for each of the wiper blade assemblies so that each motor drives a separate blade assembly, the blade assemblies having a tendency to be driven at different speeds, plural detectors for detecting the motion of the blade assemblies, one of said detectors being provided for each of the blade assemblies, and means responsive to the detectors for controlling the motors so: (a) all of the motors and blade assemblies are driven in a first direction until the slowest blade assembly reaches a first predetermined end position therefor, (b) all of the motors and blade assemblies are driven in a second direction in response to the slowest blade assembly reaching the predetermined first end position therefor, (c) all of the motors and blade assemblies continue to be driven in the second direction until the slowest blade assembly reaches a second predetermined end position therefor, and (d) all of the motors and blade assemblies are driven in the first direction in response to the slowest blade assembly reaching the second end position.

14. The apparatus of claim 13 wherein each of the detectors includes electromechanical means for supplying a first voltage to the control means while the blade assemblies are at the end positions to overcome a second voltage normally supplied to the control means while the blade assemblies are being driven between the end positions.

15. The apparatus of claim 14 wherein each of the electromechanical means includes contacts closed only in response to the blade assembly associated therewith reaching the first and second end positions.

16. The apparatus of claim 13, 14 or 15, wherein said control means comprises a separate control circuit provided for each of the motors, the control circuit for each motor respectively including holding circuit means for continuously supplying current in a first direction to the motor while the assembly travels from the first to the second travel ends and for continuously supplying current in a second direction to the motor while the assembly travels from the second to the first end positions.

17. The apparatus of claim 13, wherein the control means comprises holding circuit means for continuously supplying current in a first direction to the motor while the assembly travels from the first to the second travel ends and for continuously supplying current in a second direction to the motor while the assembly travels from the second to the first travel ends, the detecting means including electromechanical means having contacts closed only in response to the blade assembly reaching the first and second travel ends for supplying a first bias voltage to the control means to overcome a second bias voltage supplied to the control means, and means for disrupting the current flow in the latch circuit means and activating the holding circuit means to reverse the current flow through the motor in response to the first bias voltage being supplied to the control means through the closed contacts of the electromechanical means.

18. The apparatus of claim 13 wherein said control means includes means for bidirectionally driving said motor in response to said detector and said wiper actuator to:
   (1) start the blade assemblies in a first direction from a predetermined home end position therefor and to drive the blade assemblies in the first direction until the blade assemblies reach a predetermined second end position therefor and to drive the blade assemblies in a second direction from the second end positions therefor toward the first end position in response to the wiper being in the on position, and
   (2) drive the blade assemblies to one of the end positions therefor in response to the wiper actuator being changed from the on to the off position.

19. The apparatus of claim 18 wherein each of the detectors includes electromechanical means for supplying a first voltage to the driving means while the blade assemblies are at the end positions to overcome a second voltage normally supplied to the driving means while the blade assemblies are being driven between the end positions.

20. The apparatus of claim 19 wherein each of the electromechanical means includes contacts closed only in response to the blade assembly associated therewith reaching the first and second end positions.

21. The apparatus of claim 17, 19 or 18 wherein control means includes a separate control circuit for each of the motors, the control circuit for each motor respectively including holding circuit means for continuously supplying current in a first direction to the motor while the assembly travels from the first to the second end positions and for continuously supplying current in a second direction to the motor while the assembly travels from the second to the first end positions.

22. The apparatus of claim 18 wherein the control means includes holding circuit means for continuously supplying current in a first direction to the motor while the assembly travels from the first to the second end positions and for continuously supplying current in a second direction to the motor while the assembly travels from the second to the first end position, each detector including electromechanical means having contacts closed only in response to the blade assembly associated therewith reaching the first and second end positions for supplying a first bias voltage to the control means to overcome a second bias voltage supplied to the control means while the blade assemblies travel between the end positions, and means for disrupting the current flow in the holding circuit means and activating the holding circuit means to reverse the current flow through the motor in response to the first bias voltage being supplied to the control means through the closed contacts of the electromechanical means.

23. In combination, a vehicle wiper blade assembly having first and second opposite travel ends, a blade assembly switch having on and off positions, a bidirectional electric motor for driving the blade assembly, means synchronized with the blade assembly for detecting when the blade assembly reaches the first and second travel ends, power supply terminals, electronic means for bidirectionally driving the motor between the first and second travel ends in response to the means for detecting, said electronic means including electrodes directly connected through contacts of the blade assembly switch to the power supply terminals while the blade assembly switch is actuated to the on position, the contacts being the only moving parts connected to electrodes of the electronic means while the motor is driving the assembly between the first and second opposite travel ends thereof, said electronic means being connected to the detecting means only when the blade assembly reaches the first and second travel ends, the detecting means reversing the direction of current supplied by the electronic means to the motor to change the direction of travel of the wiper blade assembly in response to the detecting means detecting the first and second travel ends.

24. The combination of claim 23 wherein the detecting means includes electromechanical means for supplying a first bias voltage to electrodes of the electronic means to overcome a second bias voltage supplied to the electrodes through the contacts of the blade assembly switch by the power supply terminals.

25. The combination of claim 24 wherein the electromechanical means includes contacts closed only in response to the blade assembly reaching the first and second travel ends.

26. The combination of claim 23, 24 or 25 wherein the electronic means includes holding circuit means for continuously supplying current in a first direction to the motor while the assembly travels from the first to the second travel ends and for continuously supplying current in a second direction to the motor while the assembly travels from the second to the first travel ends.

27. The combination of claim 23 wherein the electronic means includes holding circuit means for continuously supplying current in a first direction to the motor while the assembly travels from the first to the second travel ends and for continuously supplying current in a second direction to the motor while the assembly travels from the second to the first travel ends, the detecting means including electromechanical means having contacts closed only in response to the blade assembly reaching the first and second travel ends for supplying a first bias voltage to electrodes of the electronic means to overcome a second bias voltage supplied to the electrodes through the contacts of the blade assembly switch by the power supply terminals, and means for disrupting the current flow in the holding circuit means and activating the latch circuit means to reverse the current flow through the motor in response to the first bias voltage being supplied to electrodes of the electronic means through the closed contacts of the electromechanical means.

28. In combination, plural vehicle wiper blade assemblies each having first and second opposite travel ends; a blade assembly switch having on and off positions; plural bidirectional electric motors each respectively driving the plural wiper blade assemblies; plural means, each respectively synchronized with one of the plural wiper blade assemblies, for detecting when the respective wiper blade assemblies reach the first and second travel ends; power supply terminals; plural electronic means, each respectively driving one of the motors between the first and second travel ends in dependence of the means for detecting, each of said electronic means including electrodes directly connected through contacts of the blade assembly switch to the power supply terminals while the blade assembly switch is actuated to the on position, the contacts being the only moving parts connected to electrodes of the electronic means while the motor associated with the respective electronic means is driving the assembly associated with the respective electronic means between the first and second opposite travel ends thereof, each of said electronic means being connected to the detecting means associated with the respective electronic means only when the blade assembly associated with the respective electronic means reaches the first and second travel ends so that the detecting means reverses the direction of current supplied by the electronic means to the motor to change the direction of travel of the wiper blade assembly in response to the detecting means detecting the first and second travel means.

29. The combination of claim 28 wherein each of the detecting means includes electromechanical means for supplying a first bias voltage to electrodes of the electronic means to overcome a second bias voltage supplied to the electrodes through the contacts of the blade assembly switch by the power supply terminals.

30. The combination of claim 29 wherein each of the electromechanical means includes contacts closed only in response to the blade assembly associated therewith reaching the first and second travel ends.

31. The combination of claim 30 wherein the contacts of the electromechanical means are interconnected with each other so that the second bias voltage is applied to the electrodes of the plural electronic means through the contacts of the electromechanical means only in response to all of the wiper blade assemblies being at one of the travel ends thereof.

32. The combination of claim 28, 29, 30 or 31 wherein each of the electronic means includes holding circuit means for continuously supplying current in a first direction to the motor associated with the respective electronic means while the assembly associated with the respective electronic means travels from the first to the second travel ends, and for continuously supplying current in a second direction to the motor while the assembly travel from the second to the first travel ends.

33. The combination of claim 28 wherein the electronic means includes holding circuit means for continuously supplying current in a first direction to the motor while the assembly travels from the first to the second travel ends and for continuously supplying current in a second direction to the motor while the blade assembly travels from the second to the first travel ends, the detecting means including electromechanical means having contacts closed only in response to the blade assembly reaching the first and second travel ends for supplying a first bias voltage to electrodes of the electronic means to overcome a second bias voltage supplied to the electrodes through the contacts of the blade assembly switch by the power supply terminals, and means for disrupting the current flow in the latch circuit means and activating the latch circuit means to reverse the current flow through the motor in response to the first bias voltage being supplied to electrodes of the electronic means through the closed contacts of the electromechanical means.

* * * * *

UNITED STATES PATENT OFFICE
CERTIFICATE OF CORRECTION

PATENT NO. : 4,405,887
DATED : September 20, 1983
INVENTOR(S) : Takeo Tamura, Hiroshi Hara & Takayoshi Kido It is certified that error appears in the above-identified patent and that said Letters Patent are hereby corrected as shown below:

On the title page
Item [73], (Assignee:), please add:

--ICHIKO INDUSTRIES LIMITED, Tokyo, Japan--

Signed and Sealed this

Twenty-seventh Day of December 1983

[SEAL]

Attest:

GERALD J. MOSSINGHOFF

Attesting Officer      Commissioner of Patents and Trademarks